Aug. 7, 1928.
H. A. LONGINO
1,679,431
CORN POPPER
Filed Sept. 10, 1927  2 Sheets-Sheet 2
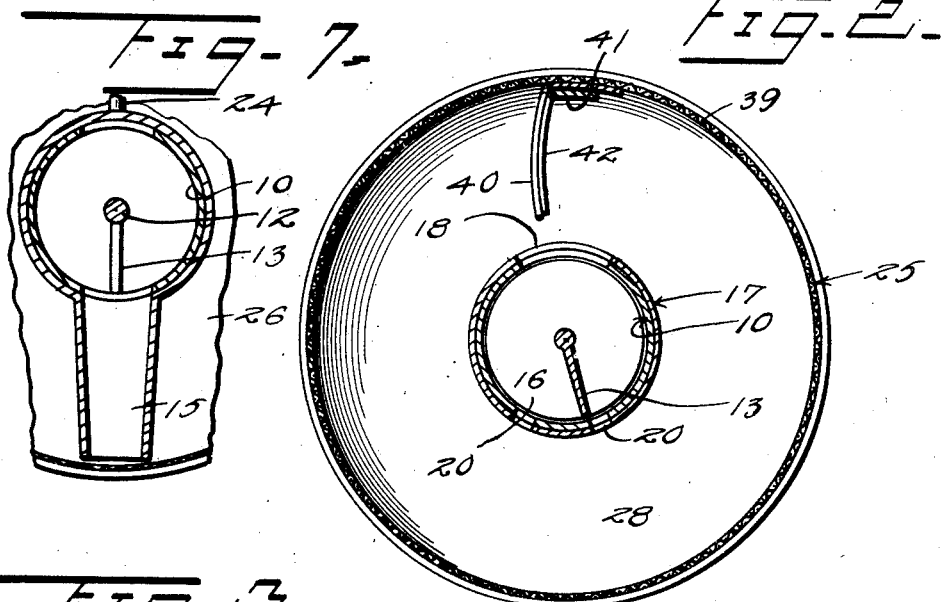
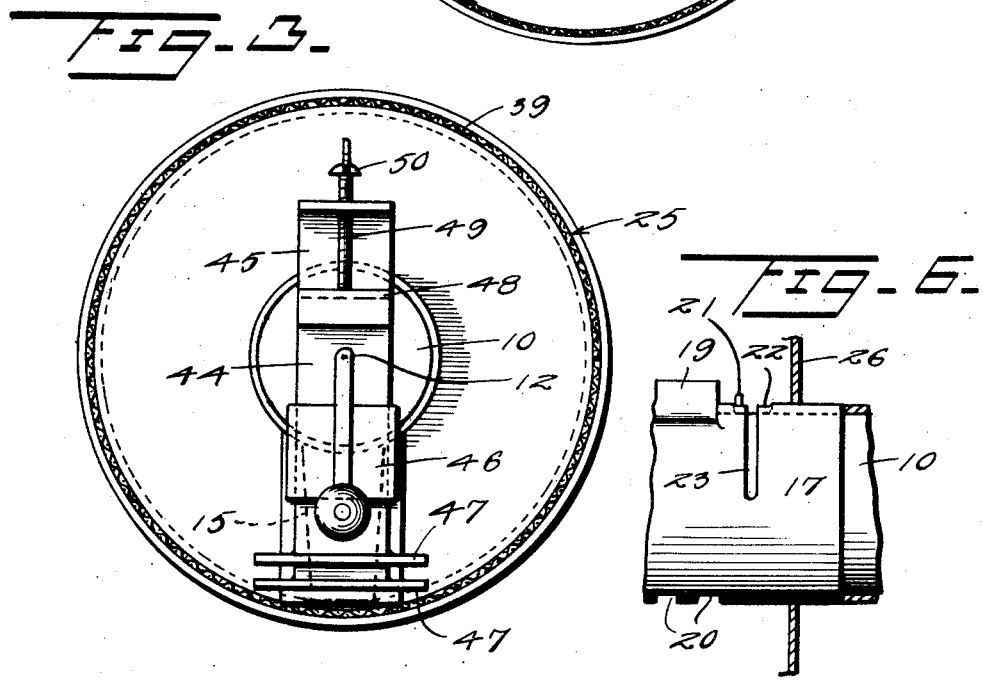
Inventor
H. A. Longino
By Watson E. Coleman
Attorney Patented Aug. 7, 1928.

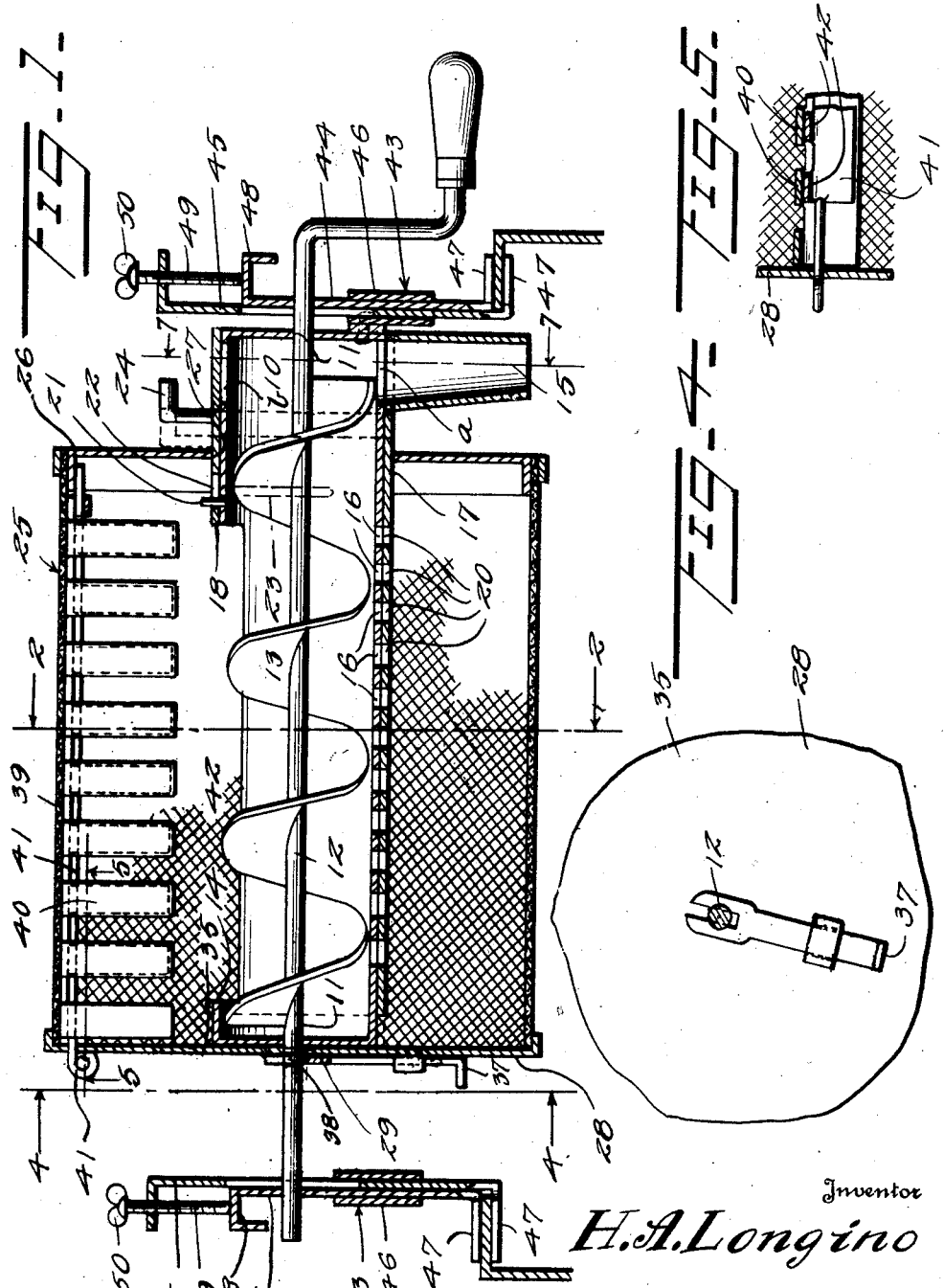

1,679,431

UNITED STATES PATENT OFFICE.

HUGH A. LONGINO, OF RINGLING, OKLAHOMA.

CORN POPPER.

Application filed September 10, 1927. Serial No. 218,799.

This invention relates to corn poppers and more particularly to a device of this character which is capable of use for continually popping corn embodying means for discharging popped corn while in operation, and receiving any reasonable quantity of unpopped corn at one filling.

An important object of the invention is to provide means whereby the popped corn may be separated from the unpopped corn and popped corn delivered to a discharge conveyor by means of which it is carried from the popping apparatus.

A further object of the invention is to provide means for separating any kernels of any unpopped corn, which may be delivered with the popped corn to the conveying apparatus from the popped corn before it is withdrawn from the apparatus.

A still further object of the invention is to provide means whereby the conveying apparatus and separating apparatus may be arranged to deliver from the apparatus all of the corn contained therein whether popped or unpopped.

A still further object of the invention is to provide novel and improved means for delivering corn to the interior of the apparatus.

These and other objects I attain by the construction shown in the accompanying drawings, wherein for the purpose of illustration is shown a preferred embodiment of my invention and wherein:—

Figure 1 is a longitudinal sectional view through corn popping mechanism constructed in accordance with my invention;

Figure 2 is a vertical sectional view on the line 2—2 of Figure 1;

Figure 3 is an end elevation of the corn popping mechanism;

Figure 4 is a section on the line 4—4 of Figure 1;

Figure 5 is a detail sectional view on the line 5—5 of Figure 1;

Figure 6 is a detail fragmentary side elevation of the drum and the sleeve mounted thereon.

Fig. 7 is a detail sectional view on the line 7—7 of Fig. 1.

Referring now more particularly to the drawings, the numeral 10 generally designates an interior stationary drum, the end walls of which are apertured at 11 for the passage of a shaft 12, the ends of which project beyond the ends of the drum. Within the drum, the shaft has secured thereto a worm 13 which, upon rotation of the shaft 12 in one direction, delivers material entering the drum through an opening a formed in the top thereof to an outlet spout 15. The bottom of the drum has openings 16 formed therein over which the material, passing to the outlet spout, must pass.

Surrounding the drum 10 and both rotatably and longitudinally adjustable thereon is a sleeve 17 having an opening 18 in the side wall thereof corresponding to the opening 14 of the drum 10. The sleeve 17 has in its bottom openings 20 similar to the openings 16 of the drum 10 and aligning with the openings of this drum, when the opening 18 of the sleeve aligns with the opening 14 of the drum. The drum 10 has projecting upwardly therefrom a pin 21 operating in the sleeve which has longitudinal and circumferential branches, indicated at 22 and 23 respectively. When the sleeve is so positioned that the pin is at one end of the longitudinal branch of the slot, the openings 20 and 16 of the sleeve and drum align. When at the opposite end thereof, the openings 16 and 20 are not aligned and the openings 18 and 14 are substantially but not exactly aligned. When the sleeve is rotated, so that the pin is at the end of the circumferential slot 23 remote from the slot 22, both the openings 20 and 18 are out of alignment with their corresponding openings in the drum. The sleeve 17 may be conveniently provided at its end with a projecting pin or handle 24 whereby it may be adjusted.

The numeral 25 indicates an outer drum having one end wall 26 thereof removable and provided with an opening 27 rotatably receiving the sleeve 17 between the end thereof having the handle 24 and the adjacent end of opening 18. The opposite end wall 28 has an opening 29 therein permitting passage of the shaft 12.

Slidable and attached to the wall 28 is a latch 37 for engaging a squared portion 38 of the shaft 12 to lock the outer drum structure to the shaft to rotate therewith. It will be noted that the inner end of the stationary inner drum 10 abuts the wall 28.

Secured to the inner face of the peripheral wall 39 and extending longitudinally thereof is a member embodying radially directed inwardly extending spaced fingers 40. Associated with this member and slidable longitudinally of the casing is a plate 41 embodying similar fingers 42, which, in one position thereof, close the spaces between the fingers 40 and combined therewith to form a solid radially extending wall. The inner ends of these fingers extend into proximity to the opening 18 of the sleeve 17. 43 designates leg structures. These are mounted rotatably relatively to the shaft 12 of the worm 13 and the right-hand leg structure, as clearly illustrated in Fig. 1, is rigidly connected to the drum 10 whereby the latter is held stationary. Each leg structure 43 embodies a long leg 44 and a short leg 45 held in assembled relation by a sleeve 46 secured to the shorter leg. Each leg has at its lower end a transversely extending foot 47 and at its upper end an angular flange 48. Directed through the flange 48 of the long leg and abutting the flange 48 of the short leg is an adjustable set-screw 49 which is preferably provided with a wing head 50. This set screw serves as a means for forcing the foot 47 of the long leg toward the foot 47 of the short leg, so that these feet may be clamped upon a support, if so desired.

It will be obvious that with the sleeve 17 so arranged that its openings 20 and 18 align with corresponding openings of the inner stationary drum and the plate 41 so positioned that its fingers 42 overlie the fingers 40. If the device is rotated, the fingers 40 and 42 will tend to pick up the larger of popped grains of corn and carry them with them to a point where they will discharge into the hopper mouth formed by the opening 18 and so into the inner drum. Due to the fact that these fingers are given a slight twist, the unpopped grains of corn will tend to roll therefrom and fall to the bottom of the outer drum 39, where they will be subjected to the greater heat. The popped corn falling into the stationary drum and any popped kernels which may be mixed therewith will be moved longitudinally of this drum toward the outlet spout by the worm 13. The small or unpopped grains arriving at the openings 20 will fall therethrough and be returned to the outer drum. If, for any reason, it is desired to remove all of the contents of the drum 39, the plate 41 is shifted longitudinally by its handle end 41ᵃ, which projects to the exterior of the casing until its fingers 42 lie intermediate the fingers 40. The wall thus provided will pick up all of the contents of the container and deliver them into the stationary drum. The sleeve 17 is shifted, so that the openings 18 and 14 remain in alignment, while the openings 20 and 16 are thrown out of alignment. Thus, the unpopped corn will be delivered with the popped corn from the outlet spout 15. Since the end 26 of the outer drum is removable, all that is necessary if repairs are to be made to the interior of the main drum or to the stationary drum or its worm is to disengage the latch 37 and shift the inner drum longitudinally.

The spout 15 is rotatably adjusted on stationary drum 10. The drum 10 being perforated at "a" and "b", "a" being the outlet for the popped corn into the spout and "b" being the intake for the unpopped corn when the spout 15 is so rotated as to align its mouth with the drum perforation "b". The spout 15 serves as a funnel for pouring the corn into the popper. By a backward turn of the worm 13, the unpopped corn is carried into the drum 39 through the openings 16 and 20 in the drum 10 and sleeve 17 respectively, both distributing the unpopped corn in drum 29 and agitating the corn that may be in a popping stage. When spout 15 and "a" are aligned, "b" is closed by the sleeve on spout 15, and vice versa with "b".

Since the construction hereinbefore set forth is capable of a certain range of change and modification without materially departing from the spirit of the invention, I do not limit myself to such specific structure except as hereinafter claimed.

I claim:—

1. In a corn popper, a stationary inner drum having an opening in its top, a rotatable outer drum surrounding that portion of the inner drum in which the opening is formed, a worm within the inner drum, an outlet spout at one end of the inner drum and a shaft for rotating said worm and outer drum, the bottom wall of the inner drum within the outer drum having longitudinally spaced openings formed therein of a size permitting the passage of unpopped corn therethrough.

2. In a corn popper, a stationary inner drum having an opening in its top, a rotatable outer drum surrounding that portion of the inner drum in which the opening is formed, a worm within the inner drum, an outlet spout at one end of the inner drum, a shaft for rotating said worm and outer drum, a plurality of fingers secured to and extending inwardly from the wall of the outer drum and adapted to separate popped from unpopped corn and delivering the popped corn into the opening of the inner drum, and means associated with said fingers shiftable to close the space between the fingers whereby unpopped as well as popped corn is picked up thereby and delivered into the opening of the inner drum.

3. In a corn popper, a stationary inner drum having an opening in its top, a rotatable outer drum surrounding that portion of the inner drum in which the opening is formed, a worm within the inner drum, an outlet spout at one end of the inner drum, a shaft for rotating said worm and outer drum and a plurality of fingers secured to and extending inwardly from the wall of the outer drum and adapted to separate popped from unpopped corn and delivering the popped corn into the opening of the inner drum, the bottom wall of the inner drum having longitudinally spaced openings of size permitting the passage therethrough of unpopped corn.

4. In a corn popper, a stationary inner drum having an opening in its top, a rotatable outer drum surrounding that portion of the inner drum in which the opening is formed, a worm within the inner drum, an outlet at one end of the inner drum, a shaft for rotating said worm and outer drum, a plurality of fingers secured to and extending inwardly from the wall of the outer drum and adapted to separate popped from unpopped corn and delivering the popped corn into the opening of the inner drum, means associated with said fingers shiftable to close the space between the fingers whereby unpopped as well as popped corn is picked up thereby and delivered into the opening of the inner drum, the bottom wall of the inner drum having longitudinally spaced openings permitting the passage therethrough of unpopped corn and means for closing said openings.

5. In a corn popper, a stationary inner drum having an opening in its top, a rotatable outer drum surrounding that portion of the inner drum in which the opening is formed, a worm within the inner drum, an outlet at one end of the inner drum, a shaft for rotating said worm and outer drum, and a sleeve surrounding the inner drum having an opening corresponding to the opening thereof, said sleeve being rotatable to a position where the opening thereof is out of alignment with the opening of the inner drum.

6. In a corn popper, a stationary inner drum having an opening in its top, a rotatable outer drum surrounding that portion of the inner drum in which the opening is formed, a worm within the inner drum, an outlet at one end of the inner drum, a shaft for rotating said worm and outer drum, a plurality of fingers secured to and extending inwardly from the wall of the outer drum and adapted to separate popped from unpopped corn and delivering the popped corn into the opening of the inner drum, means associated with said fingers shiftable to close the space between the fingers whereby unpopped as well as popped corn is picked up thereby and delivered into the opening of the inner drum, a sleeve surrounding the inner drum and having an opening in its top wall corresponding to the opening in the top of the inner drum and openings in its bottom wall corresponding to the opening in the bottom wall of the inner drum and means for shifting said sleeve to throw the bottom openings of the inner drum and sleeve out of alignment, while leaving the upper openings substantially in alignment.

7. In a corn popper, a stationary inner drum having an opening in its top, a rotatable outer drum surrounding that portion of the inner drum in which the opening is formed, a worm within the inner drum, an outlet at one end of the inner drum, a shaft for rotating said worm and outer drum, a plurality of fingers secured to and extending inwardly from the wall of the outer drum and adapted to separate popped from unpopped corn and delivering the popped corn into the opening of the inner drum, means associated with said fingers shiftable to close the space between the fingers whereby unpopped as well as popped corn is picked up thereby and delivered into the opening of the inner drum, a sleeve surrounding the inner drum and having an opening in its top wall corresponding to the opening in the top of the inner drum and openings in its bottom wall corresponding to the openings in the bottom wall of the inner drum and means for shifting said sleeve to throw the bottom openings of the inner drum and sleeve out of alignment, while leaving the upper openings substantially in alignment, or to move all of said openings out of alignment with one another.

8. In a corn popper, a stationary inner drum having an opening in its top, a rotatable outer drum surrounding that portion of the inner drum in which the opening is formed, a worm within the inner drum, an outlet spout at one end of the inner drum, a shaft for rotating said worm and outer drum, means upon the outer drum for separating popped from unpopped corn and delivering the popped corn to the opening of the inner drum as the outer drum is rotated, means for delivering unpopped corn to the interior of the outer drum during rotation thereof and means for delivering unpopped corn through an end of the inner drum during the rotation of the outer drum.

9. In a corn popper, a stationary inner drum having an opening in its top, a rotatable outer drum surrounding that portion of the inner drum in which the opening is formed, a worm within the inner drum, an outlet at one end of the inner drum, a shaft for rotating said worm and outer drum, the bottom wall of the inner drum within the outer drum having longitudinally spaced openings formed therein of a size permitting the passage of unpopped corn therethrough and means for closing the last named openings of the inner drum.

10. In a corn popper, a stationary inner drum having an opening in its top, a rotatable outer drum surrounding that portion of the inner drum in which the opening is formed, a worm within the inner drum, an outlet at one end of the inner drum, a shaft for rotating said worm and outer drum; the bottom wall of the inner drum within the outer drum having longitudinally spaced openings formed therein of a size permitting the passage of unpopped corn therethrough, means for closing the last named openings of the inner drum, and means carried by the outer drum for delivering either or both popped and unpopped corn or popped corn alone to the opening of the inner drum.

In testimony whereof I hereunto affix my signature.

HUGH A. LONGINO.